(12) United States Patent
Tang et al.

(10) Patent No.: US 8,814,378 B2
(45) Date of Patent: Aug. 26, 2014

(54) LCD DEVICE AND LED PACKAGE STRUCTURE THEREOF

(75) Inventors: Guo-Fu Tang, Shenzhen (CN); Gang Yu, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 105 days.

(21) Appl. No.: 13/381,079

(22) PCT Filed: Dec. 14, 2011

(86) PCT No.: PCT/CN2011/083923
§ 371 (c)(1),
(2), (4) Date: Dec. 27, 2011

(87) PCT Pub. No.: WO2013/082828
PCT Pub. Date: Jun. 13, 2013

(65) Prior Publication Data
US 2013/0141897 A1    Jun. 6, 2013

(30) Foreign Application Priority Data
Dec. 5, 2011    (CN) .......................... 2011 1 0398775

(51) Int. Cl.
| | | |
|---|---|---|
| *G09F 13/04* | (2006.01) | |
| *G09F 13/08* | (2006.01) | |
| *F21S 4/00* | (2006.01) | |
| *F21V 21/00* | (2006.01) | |
| *F21V 3/00* | (2006.01) | |
| *F21V 5/00* | (2006.01) | |

(52) U.S. Cl.
USPC ............... 362/97.3; 362/97.1; 362/249.02; 362/311.02

(58) Field of Classification Search
USPC ............... 362/97.3, 97.1, 249.02, 311.02; 257/98–100, 432
See application file for complete search history.

(56) References Cited

U.S. PATENT DOCUMENTS

| | | | |
|---|---|---|---|
| 6,026,602 A | | 2/2000 | Grondal et al. |
| 7,229,196 B2* | | 6/2007 | Hulse ............................ 362/341 |
| 7,293,906 B2* | | 11/2007 | Mok et al. ..................... 362/609 |
| 7,338,823 B2* | | 3/2008 | Han et al. ........................ 438/29 |

(Continued)

FOREIGN PATENT DOCUMENTS

| | | |
|---|---|---|
| CN | 101363578 A | 2/2009 |
| CN | 101821549 A | 9/2010 |

(Continued)

*Primary Examiner* — Peggy Neils
*Assistant Examiner* — Erin Kryukova
(74) *Attorney, Agent, or Firm* — Cheng-Ju Chiang (57) ABSTRACT

An LED package structure is disclosed, which comprises an LED chip and a frame for receiving the LED chip, and the frame comprises a bottom wall, a first sidewall and a light exiting wall. The LED chip is disposed on the bottom wall, the first sidewall is obliquely disposed in a light exiting direction of the LED chip, and light rays emitted from the LED chip are reflected by the first sidewall and then exit from the light exiting wall. An LCD device is further disclosed. According to the LCD device and the LED package structure thereof of the present disclosure, light rays emitted from the LED chip are reflected by the first sidewall and then exit from the light exiting wall. This can increase the light mixing distance for the LED chip and avoid occurrence of light emission blind areas, thus eliminating the hot spot phenomenon.

16 Claims, 6 Drawing Sheets

(56) References Cited

U.S. PATENT DOCUMENTS

| | | | |
|---|---|---|---|
| 7,635,206 B2* | 12/2009 | Huang | 362/296.01 |
| 7,674,029 B2* | 3/2010 | Liu et al. | 362/609 |
| 7,736,044 B2* | 6/2010 | Chew et al. | 362/612 |
| 7,832,886 B2* | 11/2010 | Lin | 362/84 |
| 7,905,639 B2* | 3/2011 | Luo et al. | 362/487 |
| 8,128,261 B2* | 3/2012 | Hamada | 362/311.02 |
| 8,197,105 B2* | 6/2012 | Yang | 362/346 |
| 8,558,268 B2* | 10/2013 | Kim et al. | 257/99 |
| 2008/0049449 A1* | 2/2008 | Liu et al. | 362/617 |
| 2010/0315817 A1* | 12/2010 | Zimmermann | 362/296.01 |
| 2011/0249469 A1* | 10/2011 | Lee et al. | 362/612 |
| 2012/0163026 A1* | 6/2012 | Jeon et al. | 362/612 |

FOREIGN PATENT DOCUMENTS

| | | |
|---|---|---|
| CN | 101881402 A | 11/2010 |
| CN | 201673929 U | 12/2010 |
| CN | 201680229 U | 12/2010 |
| CN | 102194981 A | 9/2011 |
| JP | 2005-212914 A | 8/2005 |

* cited by examiner

LCD DEVICE AND LED PACKAGE STRUCTURE THEREOF

This application is a national stage application of PCT application PCT/CN2011/083923 filed on Dec. 14, 2011, which is based on and claims benefit of priority from the prior Chinese Patent Application No. 201110398775.5 filed on Dec. 5, 2011.

FIELD OF THE INVENTION

The present disclosure generally relates to the field of displaying technologies, and more particularly, to a liquid crystal display (LCD) device and a light emitting diode (LED) package structure thereof.

BACKGROUND OF THE INVENTION

Figure 1:
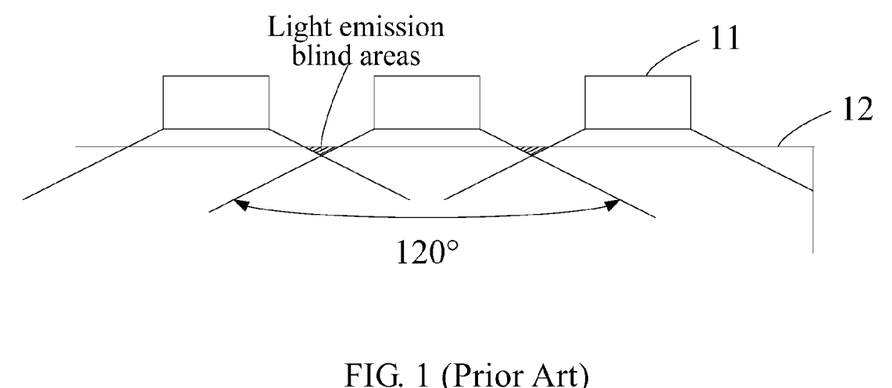
FIG. 1 is a schematic view of an LED package structure of an LCD device in the prior art.

Nowadays, use of LCD devices becomes increasingly widespread. A conventional LCD device comprises a backlight module, which further comprises a light source module and a light guide plate. The light source module is disposed at a light incident side of the light guide panel and is implemented by conventional LEDs. Each LED lamp has a certain view angle range (e.g., an elliptical LED lamp). As shown in FIG. 1, an elliptical LED lamp 11 has a view angle range of 120°. When a plurality of LEDs lamps 11 are arranged linearly on a light guide plate 12, a light emission blind area exists between two adjacent LED lamps 11 due to restriction of their view angle ranges. If a light incident surface of the light guide plate 12 is very close to the LED lamps 11, then no light rays will pass through a region of the light guide plate 12 that corresponds to the light emission blind area. Consequently, the region corresponding to the light emission blind area appears to be dark while other regions illuminated by light rays of the LED lamps 11 appear to be bright, thus causing alternate dark and bright regions. This will further cause poor light mixture performance due to hot spots generated at the light incident side of the LCD device. Increasing the distance between the light guide plate 12 and the LED lamp 11 may eliminate the hot spots, but this makes the view angle range of the LED lamps 11 even smaller and consequently degrades the utilization factor of light rays.

Accordingly, the present disclosure provides an LCD device and an LED package structure thereof that can solve the aforesaid problem.

SUMMARY OF THE INVENTION

The primary objective of the present disclosure is to provide an LCD device and an LED package structure thereof that can eliminate the hot spot phenomenon.

To achieve the aforesaid objective, the present disclosure provides an LED package structure, which comprises an LED chip and a frame for receiving the LED chip, and the frame comprises a bottom wall, a first sidewall and a light exiting wall. The LED chip is disposed on the bottom wall, the first sidewall is obliquely disposed in a light exiting direction of the LED chip and is inclined at an angle with respect to the bottom wall, the light exiting wall is disposed between the first sidewall and the bottom wall and is perpendicular to the bottom wall, the light exiting wall is formed with a light exiting aperture, and light rays emitted from the LED chip are reflected by the first sidewall and then exit from the light exiting aperture.

According to a preferred embodiment of the present disclosure, the light exiting wall is made of one of a silicone and an epoxy resin.

To achieve the aforesaid objective, the present disclosure further provides an LED package structure, which comprises an LED chip and a frame for receiving the LED chip, and the frame comprises a bottom wall, a first sidewall and a light exiting wall. The LED chip is disposed on the bottom wall, the first sidewall is obliquely disposed in a light exiting direction of the LED chip, and light rays emitted from the LED chip are reflected by the first sidewall and then exit from the light exiting wall.

According to a preferred embodiment of the present disclosure, the first sidewall is inclined at an angle with respect to the bottom wall, and the light exiting wall is disposed between the first sidewall and the bottom wall and is perpendicular to the bottom wall.

According to a preferred embodiment of the present disclosure, the frame further comprises a second sidewall and a third sidewall, and the second sidewall and the third sidewall cooperate with the bottom wall, the first sidewall and the light exiting wall to form the frame.

According to a preferred embodiment of the present disclosure, the frame is in a cuboidal form.

According to a preferred embodiment of the present disclosure, the bottom wall is disposed at a bottom of the frame, the light exiting wall is disposed at a top of the frame, the first sidewall is disposed between the bottom wall and the light exiting wall, and the first sidewall is inclined at an angle with respect to the bottom wall, the frame further comprises a second sidewall disposed opposite to the first sidewall, and light rays emitted from the LED chip are reflected by the first sidewall and then by the second sidewall and the bottom wall before exiting from the light exiting wall.

According to a preferred embodiment of the present disclosure, the frame further comprises a third sidewall and a fourth sidewall, and the third sidewall and the fourth sidewall cooperate with the bottom wall, the first sidewall, the second sidewall and the light exiting wall to form the frame.

According to a preferred embodiment of the present disclosure, the frame is in a cuboidal form.

According to a preferred embodiment of the present disclosure, the light exiting wall is formed with a light exit aperture, and light rays emitted from the LED chip exit from the light exiting aperture after being reflected.

According to a preferred embodiment of the present disclosure, the light exiting wall is made of one of a silicone and an epoxy resin.

According to a preferred embodiment of the present disclosure, a receiving space of the frame is filled with fluorescence.

To achieve the aforesaid objective, the present disclosure further provides an LCD device, which comprises a display panel; and a backlight module for providing a backlight source for the display panel. The backlight module comprises a light guide plate and a light source module, and the light source module comprises an LED package structure disposed at a side of a light incident surface of the light guide plate. The LED package structure comprises an LED chip and a frame for receiving the LED chip, and the frame comprises a bottom wall, a first sidewall and a light exiting wall. The LED chip is disposed on the bottom wall, the first sidewall is obliquely disposed in a light exiting direction of the LED chip, and light rays emitted from the LED chip are reflected by the first sidewall and then exit from the light exiting wall to the light incident surface of the light guide plate.

According to a preferred embodiment of the present disclosure, the first sidewall is inclined at an angle with respect to the bottom wall, and the light exiting wall is disposed between the first sidewall and the bottom wall and is perpendicular to the bottom wall.

According to a preferred embodiment of the present disclosure, the frame further comprises a second sidewall and a third sidewall, and the second sidewall and the third sidewall cooperate with the bottom wall, the first sidewall and the light exiting wall to form the frame.

According to a preferred embodiment of the present disclosure, the frame is in a cuboidal form.

According to a preferred embodiment of the present disclosure, the bottom wall is disposed at a bottom of the frame, the light exiting wall is disposed at a top of the frame, the first sidewall is disposed between the bottom wall and the light exiting wall, and the first sidewall is inclined at an angle with respect to the bottom wall, the frame further comprises a second sidewall disposed opposite to the first sidewall, and light rays emitted from the LED chip are reflected by the first sidewall and then by the second sidewall and the bottom wall before exiting from the light exiting wall.

According to a preferred embodiment of the present disclosure, the frame further comprises a third sidewall and a fourth sidewall, the third sidewall and the fourth sidewall cooperate with the bottom wall, the first sidewall, the second sidewall and the light exiting wall to form the frame, and the frame is of a cuboidal form.

According to a preferred embodiment of the present disclosure, the light exiting wall is formed with a light exit aperture, and light rays emitted from the LED chip exit from the light exiting aperture after being reflected.

According to a preferred embodiment of the present disclosure, the light exiting wall is made of one of a silicone and an epoxy resin, and a receiving space of the frame is filled with fluorescence.

The present disclosure has the following benefits as compared to the prior art: by disposing the LED chip on the bottom wall and having the first sidewall obliquely disposed in a light exiting direction of the LED chip, light rays emitted from the LED chip can be reflected by the first sidewall and exit from the light exiting wall. This can increase the light mixing distance for the LED chip and avoid occurrence of light emission blind areas, thus eliminating the hot spot phenomenon.

BRIEF DESCRIPTION OF THE DRAWINGS

In order to more clearly describe the technical solutions of the embodiments of the present disclosure, attached drawings to be used in the detailed description of the disclosure will be briefly described hereinbelow. Obviously, the attached drawings described hereinbelow only illustrate some of the embodiments of the present disclosure, and those of ordinary skill in the art can also obtain other attached drawings therefrom without the need of making inventive efforts, wherein.

DETAILED DESCRIPTION OF THE INVENTION

Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Figure 2:
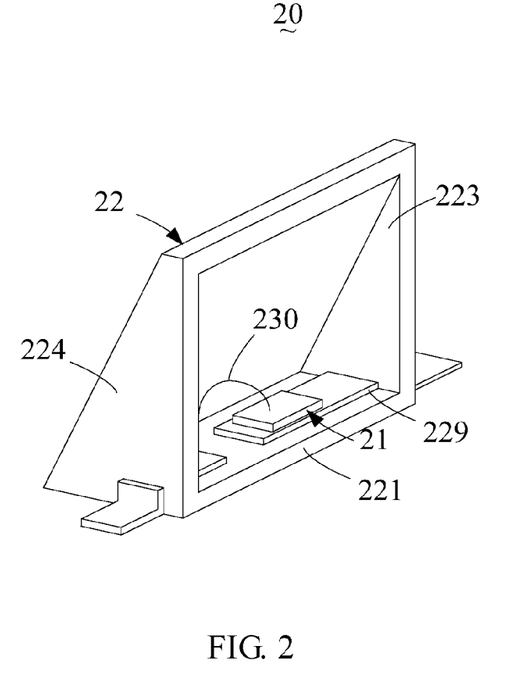
FIG. 2 is a schematic perspective view of the LED package structure according to a first embodiment of the present disclosure.
Figure 3:
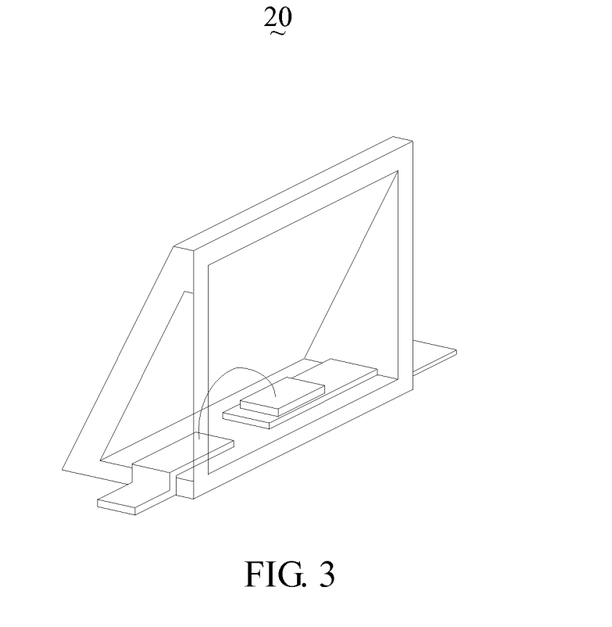
FIG. 3 is a perspective view of the LED package structure in FIG. 2.
Figure 4:
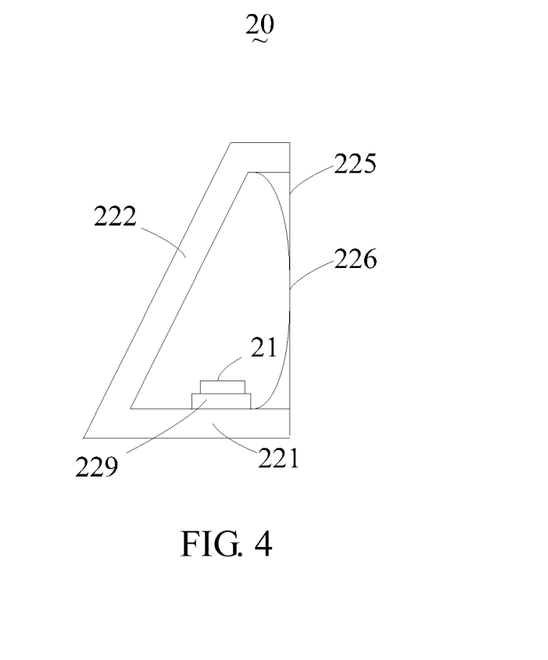
FIG. 4 is a schematic cross-sectional view of the LED package structure in FIG. 2.

Referring to FIG. 2 to FIG. 4, FIG. 2 is a schematic perspective view of an LED package structure according to a first embodiment of the present disclosure, FIG. 3 is a perspective view of the LED package structure in FIG. 2, and FIG. 4 is a schematic cross-sectional view of the LED package structure in FIG. 2. As shown in FIG. 2 to FIG. 4, the LED package structure 20 of this embodiment comprises: an LED chip 21 and a frame 22 for receiving the LED chip 21. The frame 22 comprises a bottom wall 221, a first sidewall 222, a second sidewall 223, a third sidewall 224, and a light exiting wall 225. The LED package structure 20 further comprises a soldering pin 229 and a wire 230.

In this embodiment, the soldering pin 229 is disposed on the bottom wall 221, and comprises a first soldering pin part and a second soldering pin part. The LED chip 21 is disposed on the first soldering pin part and is connected with the second soldering pin part via the wire 230; that is, the LED chip 21 is disposed on the bottom wall 221. The first sidewall 222 is obliquely disposed in a light exiting direction of the LED chip 21 and is inclined at an angle with respect to the bottom wall 221. The light exiting wall 225 is disposed between the first sidewall 222 and the bottom wall 221 and is perpendicular to the bottom wall 221. A light exiting aperture 226 is formed in the light exiting wall 225 so that light rays from the LED chip 21 can exit from the light exiting aperture 226 after being reflected by the first sidewall 222, as shown in FIG. 4.

The second sidewall 223 and the third sidewall 224 are perpendicular to the bottom wall 221, and are located on two opposite sides of the bottom wall 221 so that the bottom wall 221, the first sidewall 222, the second sidewall 223, the third sidewall 224 and the light exiting wall 225 can cooperate to form the frame 22. In this embodiment, the bottom wall 221, the first sidewall 222, the second sidewall 223, the third sidewall 224 and the light exiting wall 225 are formed integrally. In other embodiments, the frame 22 may also be formed by the bottom wall 221, the first sidewall 222, the second sidewall 223, the third sidewall 224 and the light exiting wall 225 in other ways as will be appreciated by people skilled in the art.

In detail, the first sidewall 222 is reflective, so the light rays emitted from the LED chip 21 can be reflected by the first sidewall 222 to exit from the light exiting aperture 226 of the light exiting wall 225, thus increasing the light mixing distance of the light rays.

As compared to the conventional LED lamp 11, the light rays emitted from the LED chip 21 in the LED package structure 20 of this embodiment are firstly reflected by the first sidewall 222 before exiting from the light exiting aperture 226. This can increase the light mixing distance for the LED chip 21 and avoid occurrence of light emission blind areas, thus eliminating the hot spot phenomenon.

Figure 5:
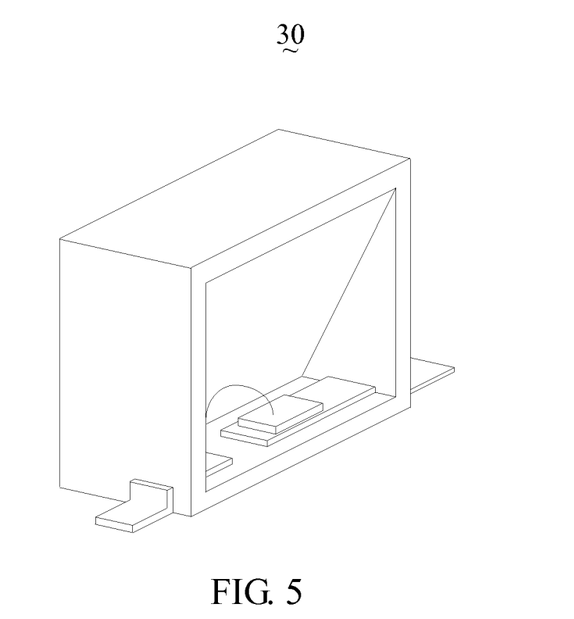
FIG. 5 is a schematic perspective view of an LED package structure according to a second embodiment of the present disclosure.
Figure 6:
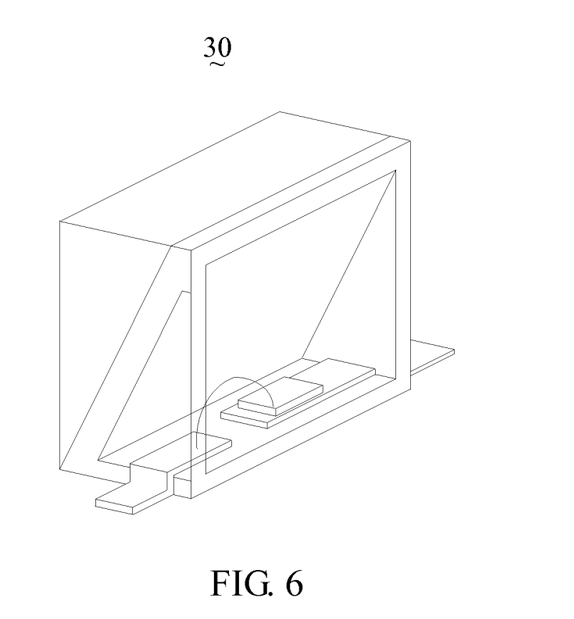
FIG. 6 is a perspective view of the LED package structure in FIG. 5.
Figure 7:
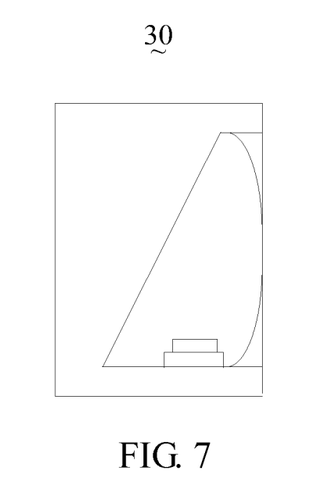
FIG. 7 is a schematic cross-sectional view of the LED package structure in FIG. 5.

Referring to FIG. 5 to FIG. 7, FIG. 5 is a schematic perspective view of an LED package structure according to a second embodiment of the present disclosure, FIG. 6 is a perspective view of the LED package structure in FIG. 5, and FIG. 7 is a schematic cross-sectional view of the LED package structure in FIG. 5. As shown in FIG. 5 to FIG. 7, the LED package structure 30 of the second embodiment of the present disclosure differs from the LED package structure 20 of the first embodiment mainly in that, a frame 32 of the LED package structure 30 of this embodiment is in a cuboidal form.

Figure 8:
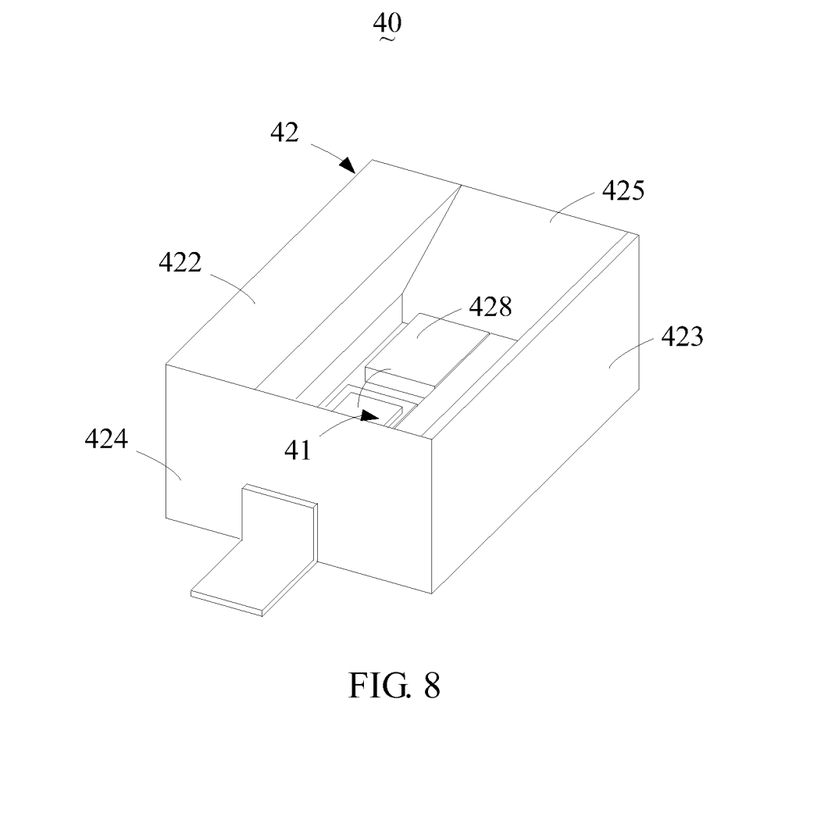
FIG. 8 is a schematic perspective view of an LED package structure according to a third embodiment of the present disclosure.
Figure 9:
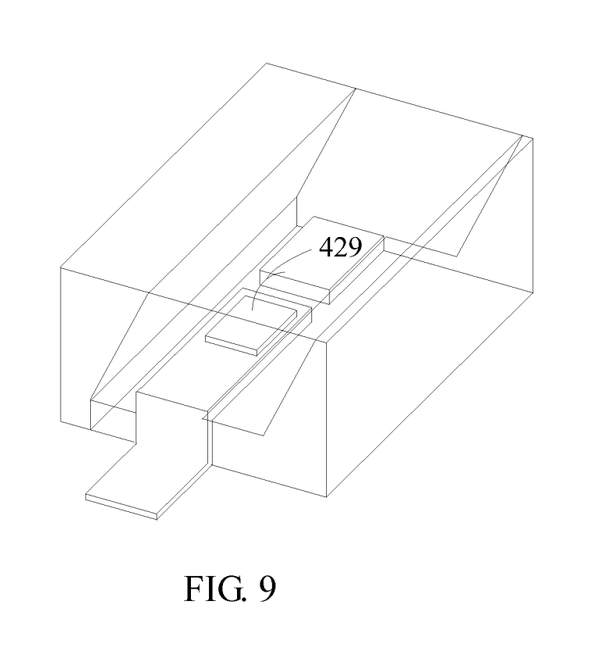
FIG. 9 is a perspective view of the LED package structure in FIG. 8.
Figure 10:
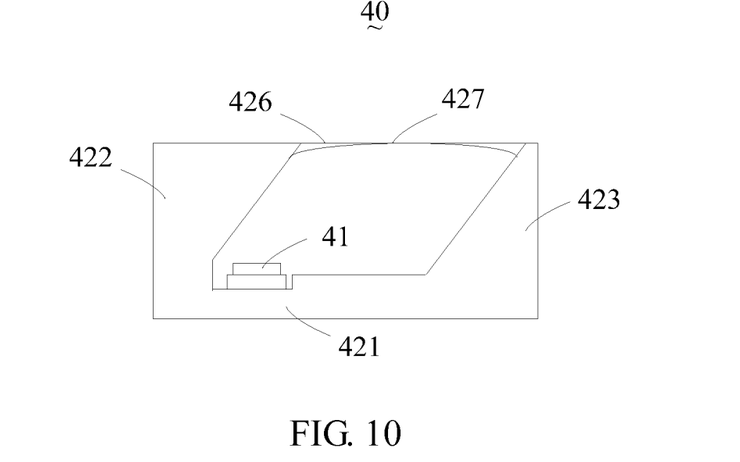
FIG. 10 is a schematic cross-sectional view of the LED package structure in FIG. 8.

Referring to FIG. 8 to FIG. 10, FIG. 8 is a schematic perspective view of an LED package structure according to a third embodiment of the present disclosure, FIG. 9 is a perspective view of the LED package structure in FIG. 8, and FIG. 10 is a schematic cross-sectional view of the LED package structure in FIG. 8. As shown in FIG. 8 to FIG. 10, a light source module 40 of this embodiment comprises: an LED chip 41 and a frame 42 for receiving the LED chip 41. The frame 42 comprises a bottom wall 421, a first sidewall 422, a second sidewall 423, a third sidewall 424, a fourth sidewall 425, and a light exiting wall 426. The LED package structure 40 further comprises a soldering pin 428 and a wire 429.

In this embodiment, the bottom wall 421 is disposed at a bottom of the frame 42. The soldering pin 428 is disposed on the bottom wall 421 and comprises a first soldering pin part and a second soldering pin part. The LED chip 41 is disposed on the first soldering pin part and is connected with the second soldering pin part via the wire 429; that is, the LED chip 41 is disposed on the bottom wall 421. The light exiting wall 426 is disposed at a top of the frame 42. The first sidewall 422 is disposed between the bottom wall 421 and the light exiting wall 426 and is inclined at an angle with respect to the bottom wall 421 so as to be obliquely disposed in a light exiting direction of the LED chip 41. The frame 42 further comprises a second sidewall 423 disposed opposite to the first sidewall 422. A light exiting aperture 427 is formed in the light exiting wall 426 so that light rays emitted from the LED chip 41 can exit from the light exiting aperture 427 of the light exiting wall 426 after being reflected by the first sidewall 422 and then by the second sidewall 423 and the bottom wall 421, as shown in FIG. 10.

The third sidewall 424 and the fourth sidewall 425 are both perpendicular to the bottom wall 421, and are disposed at two opposite sides of the bottom wall 421 so that the bottom wall 421, the first sidewall 422, the second sidewall 423, the third sidewall 424, the fourth sidewall 425 and the light exiting wall 426 cooperate to form the frame 42. In this embodiment, the frame 42 is in a cuboidal form. In other embodiments, the frame 42 may also be designed into other forms by people skilled in the art.

As compared with the conventional LED lamp 11, the light rays emitted from the LED chip 41 in the LED package structure 40 of this embodiment are firstly reflected by the first sidewall 422 and then by reflective layers on the second sidewall 423 and the bottom wall 421 before exiting from the light exiting aperture 427 of the light exiting wall 426. This can increase the light mixing distance for the LED chip 41 and avoid occurrence of light emission blind areas, thus eliminating the hot spot phenomenon.

It shall be appreciated that, the light exiting wall in the LED package structure of the present disclosure is made of a silicone or an epoxy resin. Furthermore, a receiving space of the frame may be filled with fluorescence.

Figure 11:
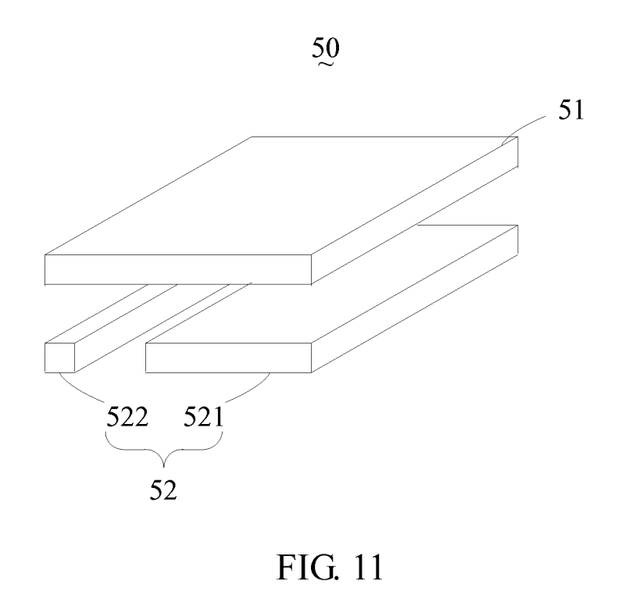
FIG. 11 is a schematic structural view of a preferred embodiment according to an LCD device of the present disclosure.

The present disclosure further provides an LCD device 50. As shown in FIG. 11, the LCD device 50 comprises a display panel 51 and a backlight module 52 for providing a backlight source for the display panel 51. The backlight module 52 comprises a light guide plate 521 and a light source module 522, and the light source module 522 comprises an LED package structure disposed at a side of a light incident surface of the light guide plate. The LED package structure comprises an LED chip and a frame for receiving the LED chip, and the frame comprises a bottom wall, a first sidewall and a light exiting wall. The LED chip is disposed on the bottom wall, the first sidewall is obliquely disposed in a light exiting direction of the LED chip. Light rays emitted from the LED chip are reflected by the first sidewall and then exit from the light exiting wall to the light incident surface of the light guide plate 521. The LED package structure may also be a structure described in any of the aforesaid embodiments of the LED package structure, and this will not be further described herein.

According to the LCD device and the LED package structure thereof of the present disclosure, by disposing the LED chip on the bottom wall and having the first sidewall obliquely disposed in a light exiting direction of the LED chip, light rays from the LED chip can be reflected by the first sidewall and exit from the light exiting wall. This can increase the light mixing distance for the LED chip and avoid occurrence of light emission blind areas, thus eliminating the hot spot phenomenon.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An LED (light emitting diode) package structure, comprising an LED chip and a frame for receiving the LED chip, and the frame comprising a bottom wall, a first sidewall and a light exiting wall, wherein the LED chip is disposed on the bottom wall, the first sidewall is obliquely disposed in a light exiting direction of the LED chip, and light rays emitted from the LED chip are reflected by the first sidewall and then exit from the light exiting wall, wherein the light exiting wall is formed with a light exit aperture, and light rays emitted from the LED chip exit from the light exiting aperture after being reflected;

wherein the bottom wall is disposed at a bottom of the frame, the light exiting wall is disposed at a top of the frame, the first sidewall is disposed between the bottom wall and the light exiting wall, and the first sidewall is inclined at an angle with respect to the bottom wall, the frame further comprises a second sidewall disposed opposite to the first sidewall, and light rays emitted from the LED chip are reflected by the first sidewall and then by the second sidewall and the bottom wall before exiting from the light exiting wall.

2. The LED package structure of claim 1, wherein the first sidewall is inclined at an angle with respect to the bottom wall, and the light exiting wall is disposed between the first sidewall and the bottom wall and is perpendicular to the bottom wall.

3. The LED package structure of claim 2, wherein the frame further comprises a second sidewall and a third sidewall, and the second sidewall and the third sidewall cooperate with the bottom wall, the first sidewall and the light exiting wall to form the frame.

4. The LED package structure of claim 1, wherein the frame further comprises a third sidewall and a fourth sidewall, and the third sidewall and the fourth sidewall cooperate with the bottom wall, the first sidewall, the second sidewall and the light exiting wall to form the frame.

5. A liquid crystal display (LCD) device, comprising:
a display panel; and
a backlight module for providing a backlight source for the display panel;
wherein the backlight module comprises a light guide plate and a light source module, the light source module comprises an LED (light emitting diode) package structure disposed at a side of a light incident surface of the light guide plate, wherein the LED package structure comprises an LED chip and a frame for receiving the LED chip, the frame comprises a bottom wall, a first sidewall and a light exiting wall, the LED chip is disposed on the bottom wall, the first sidewall is obliquely disposed in a light exiting direction of the LED chip, and light rays emitted from the LED chip are reflected by the first sidewall and then exit from the light exiting wall to the light incident surface of the light guide plate, wherein the light exiting wall is formed with a light exit aperture, and light rays emitted from the LED chip exit from the light exiting aperture after being reflected;
wherein the bottom wall is disposed at a bottom of the frame, the light exiting wall is disposed at a top of the frame, the first sidewall is disposed between the bottom wall and the light exiting wall, and the first sidewall is inclined at an angle with respect to the bottom wall, the frame further comprises a second sidewall disposed opposite to the first sidewall, and light rays emitted from the LED chip are reflected by the first sidewall and then by the second sidewall and the bottom wall before exiting from the light exiting wall.

6. The LCD device of claim 5, wherein the first sidewall is inclined at an angle with respect to the bottom wall, and the light exiting wall is disposed between the first sidewall and the bottom wall and is perpendicular to the bottom wall.

7. The LCD device of claim 6, wherein the frame further comprises a second sidewall and a third sidewall, and the second sidewall and the third sidewall cooperate with the bottom wall, the first sidewall and the light exiting wall to form the frame.

8. The LCD device of claim 5, wherein the frame further comprises a third sidewall and a fourth sidewall, the third sidewall and the fourth sidewall cooperate with the bottom wall, the first sidewall, the second sidewall and the light exiting wall to form the frame, and the frame is of a cuboidal form.

9. The LED package structure of claim 3, wherein the LED package structure further comprises a soldering pin and a wire, the soldering pin is disposed on the bottom wall, and comprises a first soldering pin part and a second soldering pin part, the LED chip is disposed on the first soldering pin part and is connected with the second soldering pin part via the wire.

10. The LED package structure of claim 9, wherein the first soldering pin part is separate from the second soldering pin part.

11. The LED package structure of claim 9, wherein the first soldering pin part and the second soldering pin part each comprise an end located outside the frame.

12. The LED package structure of claim 11, wherein the first soldering pin part and the second soldering pin part perpendicularly pass through the second side wall and the third side walls, respectively.

13. The LCD device of claim 7, wherein the LED package structure further comprises a soldering pin and a wire, the soldering pin is disposed on the bottom wall, and comprises a first soldering pin part and a second soldering pin part, the LED chip is disposed on the first soldering pin part and is connected with the second soldering pin part via the wire.

14. The LCD device of claim 13, wherein the first soldering pin part is separate from the second soldering pin part.

15. The LCD device of claim 13, wherein the first soldering pin part and the second soldering pin part each comprise an end located outside the frame.

16. The LCD device of claim 15, wherein the first soldering pin part and the second soldering pin part perpendicularly pass through the second side wall and the third side walls, respectively.

* * * * *